US011164022B2

United States Patent
Zhou et al.

(10) Patent No.: US 11,164,022 B2
(45) Date of Patent: Nov. 2, 2021

(54) METHOD FOR FINGERPRINT ENROLLMENT, TERMINAL, AND NON-TRANSITORY COMPUTER READABLE STORAGE MEDIUM

(71) Applicant: Guangdong Oppo Mobile Telecommunications Corp., Ltd., Guangdong (CN)

(72) Inventors: Haitao Zhou, Guangdong (CN); Lizhong Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 161 days.

(21) Appl. No.: 16/564,976

(22) Filed: Sep. 9, 2019

(65) Prior Publication Data

US 2019/0392237 A1     Dec. 26, 2019

Related U.S. Application Data

(63) Continuation of application No. PCT/CN2017/103224, filed on Sep. 25, 2017.

(30) Foreign Application Priority Data

Mar. 8, 2017 (CN) .......................... 201710136621.6

(51) Int. Cl.
*G06K 9/36* (2006.01)
*G06K 9/00* (2006.01)

(52) U.S. Cl.
CPC ..... *G06K 9/00926* (2013.01); *G06K 9/00087* (2013.01); *G06K 9/00013* (2013.01)

(58) Field of Classification Search
CPC ............ G06K 9/00926; G06K 9/0006–9/0012
See application file for complete search history.

(56) References Cited

U.S. PATENT DOCUMENTS 9,483,681 B2    11/2016  Kumar et al.
10,146,981 B2 * 12/2018  Sezan ................ G06K 9/00926
(Continued)

FOREIGN PATENT DOCUMENTS

CN      105389565 A    3/2016
CN      105447454 A    3/2016
(Continued)

OTHER PUBLICATIONS

Examination report issued in corresponding European application No. 17899702.9 dated Jul. 6, 2020.
(Continued)

*Primary Examiner* — Brian Werner
(74) *Attorney, Agent, or Firm* — Young Basile Hanlon & MacFarlane, P.C.

(57) ABSTRACT

A method for fingerprint enrollment, a terminal, and a non-transitory computer readable storage medium are provided. The method includes the following. An enrolled fingerprint image is acquired. The enrolled fingerprint image is compared with a preset fingerprint template. Fingerprint ID of the preset fingerprint template is determined as fingerprint ID of the enrolled fingerprint image when the enrolled fingerprint image matches the preset fingerprint template. New fingerprint ID is generated as the fingerprint ID of the enrolled fingerprint image when the enrolled fingerprint image fails to match the preset fingerprint template.

17 Claims, 7 Drawing Sheets

(56) References Cited

U.S. PATENT DOCUMENTS

| | | | |
|---|---|---|---|
| 2003/0068072 A1* | 4/2003 | Hamid | G06K 9/0002 |
| | | | 382/124 |
| 2003/0206133 A1 | 11/2003 | Cheng | |
| 2004/0255128 A1* | 12/2004 | Ohba | G06K 9/6255 |
| | | | 713/186 |
| 2005/0270140 A1* | 12/2005 | Oh | G06K 9/6255 |
| | | | 340/5.83 |
| 2012/0114195 A1 | 5/2012 | Matsuda et al. | |
| 2015/0110367 A1 | 4/2015 | Kumar et al. | |
| 2016/0330615 A1 | 11/2016 | Hania et al. | |
| 2019/0018945 A1* | 1/2019 | Zhou | G06F 21/32 |
| 2019/0065808 A1* | 2/2019 | Zhang | G06F 3/04886 |

FOREIGN PATENT DOCUMENTS

| | | |
|---|---|---|
| CN | 105469022 A | 4/2016 |
| CN | 105912915 A | 8/2016 |
| CN | 106021606 A | 10/2016 |
| CN | 106022050 A | 10/2016 |
| GB | 2511467 A | 9/2014 |

OTHER PUBLICATIONS

English Translation of the first OA issued in corresponding CN application No. 201710136621.6 dated Mar. 14, 2019.
English Translation of the second OA issued in corresponding CN application No. 201710136621.6 dated May 7, 2019.
English Translation of the Rejection decision issued in corresponding CN application No. 201710136621.6 dated Jul. 5, 2019.
Partial search report issued in corresponding European application No. 17899702.9 dated Jan. 7, 2020.
International search report issued in corresponding international application No. PCT/CN2017/103224 dated Dec. 1, 2017.
Extended European search report issued in corresponding European application No. 17899702.9 dated Apr. 9, 2020.
Indian Examination Report for IN Application 201917039418 dated Mar. 31, 2021. (7 pages).

* cited by examiner

METHOD FOR FINGERPRINT ENROLLMENT, TERMINAL, AND NON-TRANSITORY COMPUTER READABLE STORAGE MEDIUM

CROSS-REFERENCE TO RELATED APPLICATION(S)

This application is a continuation of International Application No. PCT/CN2017/103224, filed on Sep. 25, 2017, which claims priority to Chinese Patent Application No. 201710136621.6, filed on Mar. 8, 2017, the disclosures of both of which are hereby incorporated by reference in their entireties.

TECHNICAL FIELD

The present disclosure relates to the technical field of electronic device, and particularly to a method for fingerprint enrollment and related products.

BACKGROUND

With the rapid development of information technologies, terminals such as mobile phones and tablet computers become increasingly popular. At present, fingerprint recognition and security technologies gradually popularize and become standard configuration of terminals in respective manufacturers. Accordingly, more fingerprint identification (ID) can be stored in the terminal.

SUMMARY

According to a first aspect of implementations of the present disclosure, a method for fingerprint enrollment is provided. The method includes the following. An enrolled fingerprint image is acquired. The enrolled fingerprint image is compared with a preset fingerprint template. Fingerprint ID of the preset fingerprint template is determined as fingerprint ID of the enrolled fingerprint image when the enrolled fingerprint image matches the preset fingerprint template. New fingerprint ID is generated as the fingerprint ID of the enrolled fingerprint image when the enrolled fingerprint image fails to match the preset fingerprint template.

According to a second aspect of implementations of the present disclosure, a terminal is provided. The terminal includes at least one processor and a computer readable storage. The computer readable storage is coupled to the at least one processor and stores at least one computer executable instruction thereon which, when executed by the at least one processor, causes the at least one processor to execute the method of the first aspect.

According to a third aspect of implementations of the present disclosure, a non-transitory computer readable storage medium is provided. The non-transitory computer readable storage medium is configured to store a computer program which, when executed by a processor, causes the processor to execute the method of the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
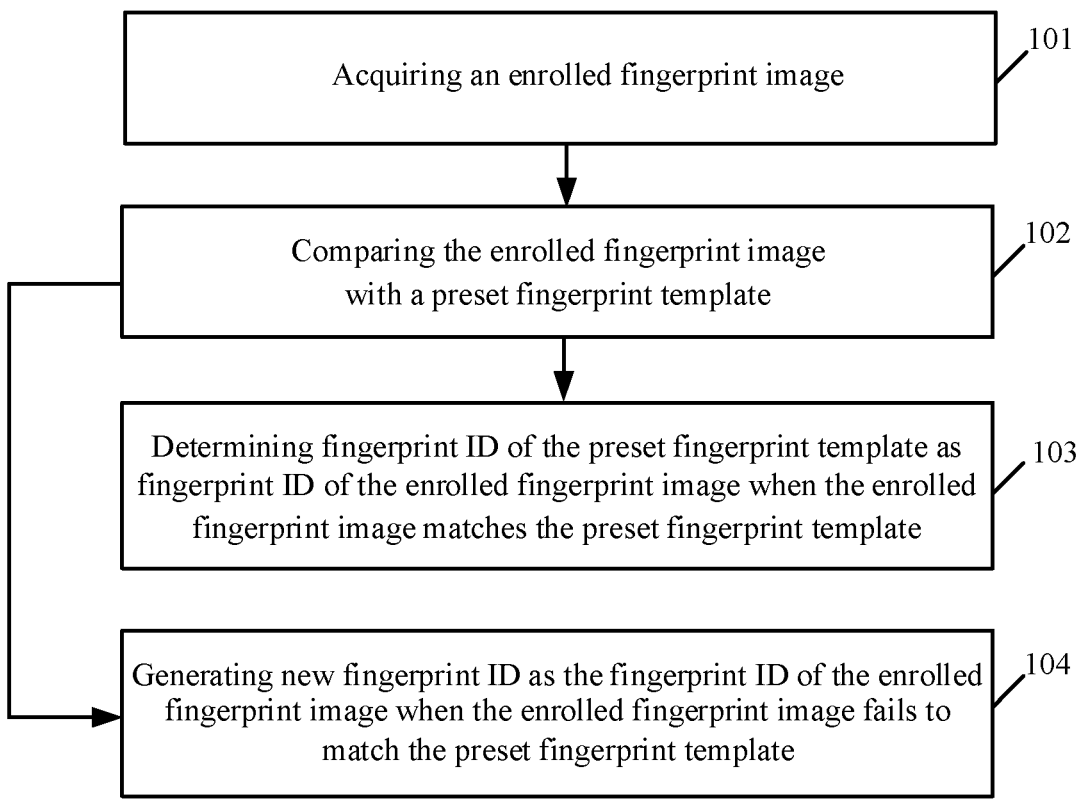
FIG. 1 is a schematic flow chart illustrating a method for fingerprint enrollment according to a first implementation of the present disclosure.

In practical applications, the following may occur. For example, in payment applications, more and more companies now support fingerprint payment with terminals. In fingerprint enrollment or fingerprint registration, one finger can be enrolled for multiple times and therefore, one finger may correspond to multiple different fingerprint identification (ID). When making payment verification with a finger, a fingerprint enrolled for payment may correspond to one of the multiple different fingerprint ID. When making payment, due to differences in fingerprint regions, the same finger may be recognized as corresponding to another fingerprint ID rather than the one fingerprint ID of the fingerprint enrolled for such payment. In this case, the payment may fail and the efficiency of fingerprint recognition may be affected. In implementations of the present disclosure, a method for fingerprint enrollment and related products are provided for improving the efficiency of fingerprint recognition.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, a method, a system, a product, or a device including a series of steps or units is not limited to the listed steps or units, but can optionally include other steps or units not listed. Alternatively, other steps or units inherent to the process, the method, the product, or the device can be included either.

The term "embodiment" or "implementation" referred to herein means that a particular feature, structure, or feature described in conjunction with the implementation may be contained in at least one implementation of the present disclosure. This phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

A terminal illustrated in implementations of the present disclosure may include a smart phone such as an Android® phone, an iOS® phone, and a Windows® phone, a tablet, a palmtop, a laptop, a mobile internet device (MID), a wearable device, or the like, which is not exhausted by only listed as examples. The terminal include, but is not limited to, the listed terminals. In an example, the terminal stores at least one fingerprint template. In an example, a preset fingerprint template refers to a fingerprint template prestored in the terminal. Each fingerprint template corresponds to unique fingerprint ID. For example, a fingerprint enrolled in the terminal by a user may correspond to fingerprint ID of "fingerprint 1". In addition, it should be noted that, one fingerprint ID may correspond to at least one fingerprint template. For example, the fingerprint ID of the fingerprint template A and the fingerprint ID of the fingerprint template B may both correspond to "fingerprint 1".

FIG. 1 is a schematic flow chart illustrating a method for fingerprint enrollment according to a first implementation of the present disclosure. The method for fingerprint enrollment illustrated in the implementation of the present disclosure begins at block 101.

At block 101, an enrolled fingerprint image is acquired.

When fingerprints are enrolled or registered with a terminal, a fingerprint recognition module may be pressed by a user multiple times to collect (in other words, receive) images. The images collected are then combined to form a complete enrolled fingerprint image. After successful enrollment, the enrolled fingerprint image or registered fingerprint image can be acquired.

The enrolled fingerprint image may correspond to payment applications or other applications.

At block 102, the enrolled fingerprint image is compared with a preset fingerprint template.

The terminal may prestore preset fingerprint templates. One or more preset fingerprint templates can be stored in the terminal. Implementations of the present disclosure are illustrated with only one preset fingerprint template.

At block 103, fingerprint ID of the preset fingerprint template is determined as fingerprint ID of the enrolled fingerprint image when the enrolled fingerprint image matches the preset fingerprint template.

The enrolled fingerprint image is compared with the preset fingerprint template by the terminal. In a case that the enrolled fingerprint image matches the preset fingerprint template, it indicates that the enrolled fingerprint image and the preset fingerprint template are from fingerprints of a same finger. Therefore, the fingerprint ID of the preset fingerprint template can be determined as the fingerprint ID of the enrolled fingerprint image, and there is no need to store the enrolled fingerprint image as a fingerprint template because a fingerprint template similar to the enrolled fingerprint image is already stored in the terminal.

At block 104, new fingerprint ID is generated as the fingerprint ID of the enrolled fingerprint image when the enrolled fingerprint image fails to match the preset fingerprint template.

When the enrolled fingerprint image fails to match the preset fingerprint template, the new fingerprint ID can be generated as the fingerprint ID of the enrolled fingerprint image.

After or at the time the new fingerprint ID is generated as the fingerprint ID of the enrolled fingerprint image, the enrolled fingerprint image can be stored as the new fingerprint template.

In an implementation, at block 104, the new fingerprint ID is generated as the fingerprint ID of the enrolled fingerprint image as follows.

41) Current time and current geographical location information are acquired.

42) The new fingerprint ID is generated according to the current time and the current geographical location information. The new fingerprint ID is determined as the fingerprint ID of the enrolled fingerprint image.

In an implementation, the current time and the current geographical location information are acquired at 41) as follows.

The current time is read via a clock application and the current geographical location information is determined via global positioning system (GPS) or wireless fidelity (Wi-Fi) positioning technologies.

The current time can be read via the clock application and the current geographical location information can be determined via GPS or Wi-Fi positioning technologies by the terminal. The new fingerprint ID can be generated according to the current time and the current geographical location information. For example, the new fingerprint ID can be generated according to a short name of the current time and an English name of the current geographical location information. For example, the current time is 4:30 p.m. (Afternoon) and a current geographical location is Beijing (Beijing), then the new fingerprint ID can be A-Beijing. The fingerprint ID of the enrolled fingerprint image can be determined as A-Beijing. In this way, a personalized fingerprint ID can be generated automatically for the enrolled fingerprint image.

In an implementation, at block 104, the new fingerprint ID is generated as the fingerprint ID of the enrolled fingerprint image as follows.

The new fingerprint ID input by a user is acquired and the new fingerprint ID is used as the fingerprint ID of the enrolled fingerprint image. In this way, the fingerprint ID can be input by the user himself/herself.

In an implementation, at block 104, the following is further performed when the enrolled fingerprint image fails to match the preset fingerprint template.

43) Ask the user to determine whether the enrolled fingerprint image and the preset fingerprint template are from a same finger.

44) The fingerprint ID of the preset fingerprint template is determined as the fingerprint ID of the enrolled fingerprint image and the enrolled fingerprint image is stored as the new fingerprint template, based on a determination that the enrolled fingerprint image and the preset fingerprint template are from the same finger.

45) Proceed to the operations that the new fingerprint ID is generated as the fingerprint ID of the enrolled fingerprint image and the enrolled fingerprint image is stored as the new fingerprint template, based on a determination that the enrolled fingerprint image and the preset fingerprint template are from different fingers.

In a case that the enrolled fingerprint image fails to match the preset fingerprint template, it indicates that no fingerprint image of a finger corresponding to the enrolled fingerprint image is enrolled previously, or a fingerprint image of the finger corresponding to the enrolled fingerprint image is enrolled previously but the enrolled fingerprint image is different from an enrolled fingerprint image enrolled previously. For example, different regions of the same finger may be enrolled as fingerprint images for enrollment. Then, ask the user to determine whether the enrolled fingerprint image and the preset fingerprint template are from the same finger. The fingerprint ID of the preset fingerprint template can be determined as the fingerprint ID of the enrolled fingerprint image and the enrolled fingerprint image can be stored as the new fingerprint template, based on a determination of the user that the enrolled fingerprint image and the preset fingerprint template are from the same finger. Proceed to the operations that the new fingerprint ID can be generated as the fingerprint ID of the enrolled fingerprint image and the enrolled fingerprint image can be stored as the new fingerprint template by the terminal, based on a determination of the user that the enrolled fingerprint image and the preset fingerprint template are from different fingers. In this way, fingerprint images of the same finger can be mapped to the same fingerprint ID, thereby reducing the risk of failure of the fingerprint recognition resulting from recognizing the fingerprint images of the same finger as having different fingerprint ID, and further avoiding wasting storage space due to storing multiple fingerprint ID for one finger in the terminal.

In the implementations of the present disclosure, the enrolled fingerprint image is acquired. The enrolled fingerprint image is compared with the preset fingerprint template. The fingerprint ID of the preset fingerprint template is determined as the fingerprint ID of the enrolled fingerprint image when the enrolled fingerprint image matches the preset fingerprint template. The new fingerprint ID is generated as the fingerprint ID of the enrolled fingerprint image, when the enrolled fingerprint image fails to match the preset fingerprint template. In this way, fingerprint images of the same finger obtained via multiple fingerprint enrollment can be mapped to the same fingerprint ID, thereby reducing the risk of failure of the fingerprint recognition resulting from recognizing the fingerprint images of the same finger as corresponding to different fingerprint ID, and improving the efficiency of fingerprint recognition.

Figure 2:
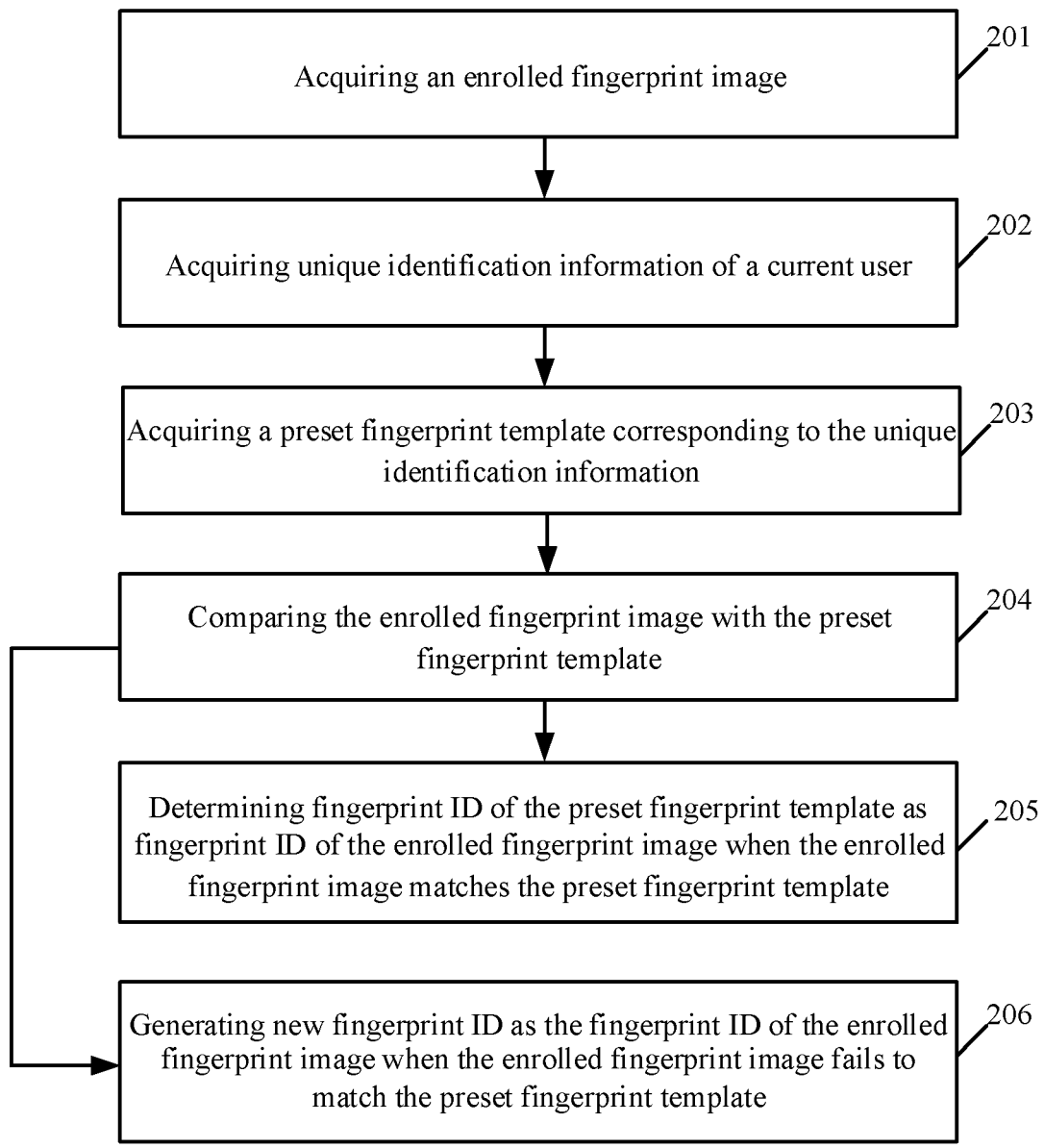
FIG. 2 is a schematic flow chart illustrating a method for fingerprint enrollment according to a second implementation of the present disclosure.

FIG. 2 is a schematic flow chart illustrating a method for fingerprint enrollment according to a second implementation of the present disclosure. The method for fingerprint enrollment illustrated in the implementation of the present disclosure begins at block 201.

At block 201, an enrolled fingerprint image is acquired.

At block 202, unique identification information of a current user is acquired.

Unique identification information of multiple users can be stored in a terminal. For example, unique identification information of user A and user B can be stored in the terminal. The unique identification information may include at least one of: a mailbox, a user name, a social account, and a phone number, and the like.

At block 203, the preset fingerprint template corresponding to the unique identification information is acquired.

For example, when using the terminal, user A can log in with his/her own username. The terminal then can recognize user A to be the current user and acquire the unique identification information of the user A. Before the implementations of the present disclosure are performed, mapping relations between unique identification information of different users and preset fingerprint templates can be preset. For example, the unique identification information of user A may correspond to a preset fingerprint template of user A, and the unique identification information of user B may correspond to a preset fingerprint template of user B.

At block 204, the enrolled fingerprint image is compared with the preset fingerprint template.

At block 205, fingerprint ID of the preset fingerprint template is determined as fingerprint ID of the enrolled fingerprint image when the enrolled fingerprint image matches the preset fingerprint template.

At block 206, new fingerprint ID is generated as the fingerprint ID of the enrolled fingerprint image when the enrolled fingerprint image fails to match the preset fingerprint template.

For detailed descriptions of the operations at block 201 and blocks 204 to 206, reference can be made to corresponding operations of the method for fingerprint enrollment illustrated in FIG. 1, and details are not repeated herein.

It can be seen that, in the implementations of the present disclosure, the enrolled fingerprint image is acquired. The unique identification information of the current user is acquired. The preset fingerprint template corresponding to the unique identification information is acquired. The enrolled fingerprint image is compared with the preset fingerprint template. The fingerprint ID of the preset fingerprint template is determined as the fingerprint ID of the enrolled fingerprint image when the enrolled fingerprint image matches the preset fingerprint template. The new fingerprint ID is generated as the fingerprint ID of the enrolled fingerprint image when the enrolled fingerprint image fails to match the preset fingerprint template. Hence, after the enrolled fingerprint image is acquired, the preset fingerprint template corresponding to the unique identification information of the current user can be acquired. In this way, fingerprint images of the same finger of the current user obtained via multiple fingerprint enrollment can be mapped to the same fingerprint ID, thereby reducing the risk of failure of the fingerprint recognition resulting from recognizing the fingerprint images of the same finger as having different fingerprint ID. In addition, the efficiency of fingerprint recognition is improved.

Figure 3:
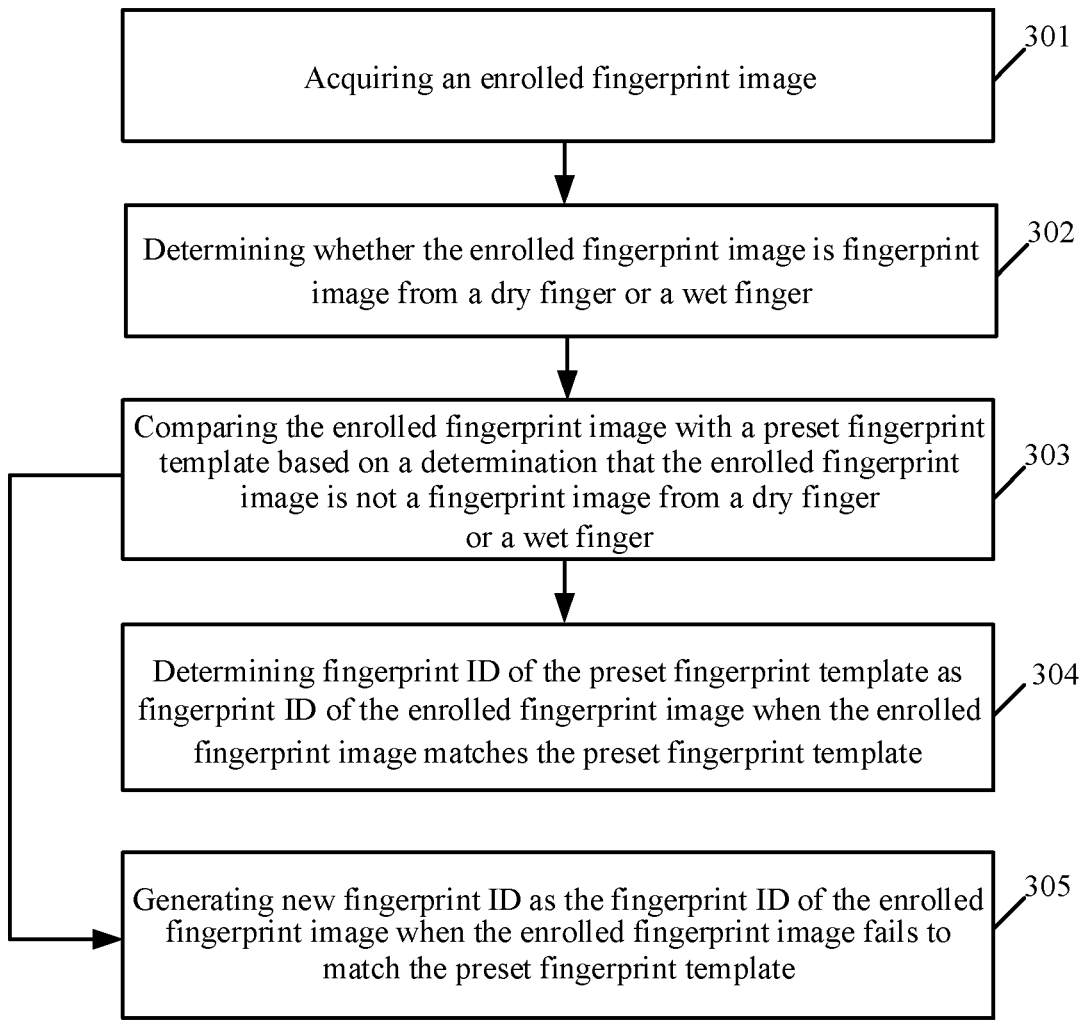
FIG. 3 is a schematic flow chart illustrating a method for fingerprint enrollment according to a third implementation of the present disclosure.

FIG. 3 is a schematic flow chart illustrating a method for fingerprint enrollment according to a third implementation of the present disclosure. The method for fingerprint enrollment illustrated in the implementation of the present disclosure begins at block 301.

At block 301, an enrolled fingerprint image is acquired.

At block 302, determine whether the enrolled fingerprint image is a fingerprint image from a dry finger or a wet finger.

The fingerprint pattern of the fingerprint image of a dry finger can be intermittent, and a large area of the fingerprint pattern of the fingerprint image of a wet finger can be blurred or almost indistinguishable. In this case, the fingerprint image can be analyzed to obtain features of the fingerprint pattern of the fingerprint image. Then, determine whether the fingerprint image is from a dry finger or a wet finger according to the features of the fingerprint pattern. For example, the features of the fingerprint pattern of the fingerprint image can be extracted to determine whether the fingerprint image is from a dry finger or a wet finger. If the fingerprint pattern of the fingerprint image is intermittent, the fingerprint image is from a dry finger. If a large area of the fingerprint pattern of the fingerprint image is blurred, the fingerprint image is from a wet finger.

It should be noted that, in normal cases, if the enrolled fingerprint image is a fingerprint image from a dry finger or a wet finger, the fingerprint image is of poor quality and does not have general features, or the number of feature points of the fingerprint image is relative less than a fingerprint image that is not from a dry finger or a wet finger. Therefore, proceed to block 303 only when the enrolled fingerprint image is not a fingerprint image form a dry finger or a wet finger.

At block 303, the enrolled fingerprint image is compared with the preset fingerprint template based on a determination that the enrolled fingerprint image is not a fingerprint image from a dry finger or a wet finger.

In an example, the operation of comparing the enrolled fingerprint image with the preset fingerprint template can be omitted when the enrolled fingerprint image is a fingerprint image from a dry finger or a wet finger. In this case, the operation of storing the enrolled fingerprint image as a fingerprint template can also be omitted.

At block 304, fingerprint ID of the preset fingerprint template is determined as fingerprint ID of the enrolled fingerprint image when the enrolled fingerprint image matches the preset fingerprint template.

At block 305, new fingerprint ID is generated as the fingerprint ID of the enrolled fingerprint image when the enrolled fingerprint image fails to match the preset fingerprint template.

For detailed descriptions of the operations at block 301 and blocks 303 to 305, reference can be made to corresponding operations of the method for fingerprint enrollment illustrated in FIG. 1, and details are not repeated herein.

It can be seen that, in the implementations of the present disclosure, the enrolled fingerprint image is acquired. The enrolled fingerprint image is compared with the preset fingerprint template when the enrolled fingerprint image is not a fingerprint image from a dry finger or a wet finger. The fingerprint ID of the preset fingerprint template is determined as the fingerprint ID of the enrolled fingerprint image when the enrolled fingerprint image matches the preset fingerprint template. The new fingerprint ID is generated as the fingerprint ID of the enrolled fingerprint image when the enrolled fingerprint image fails to match the preset fingerprint template. In this way, when the fingerprint image is not an image from a dry finger or a wet finger, fingerprint images of the same finger obtained via multiple fingerprint enrollment can be mapped to the same fingerprint ID, thereby reducing the risk of failure of the fingerprint recognition resulting from recognizing the fingerprint images of the same finger as corresponding to different fingerprint ID, and improving the efficiency of fingerprint recognition.

Figure 4:
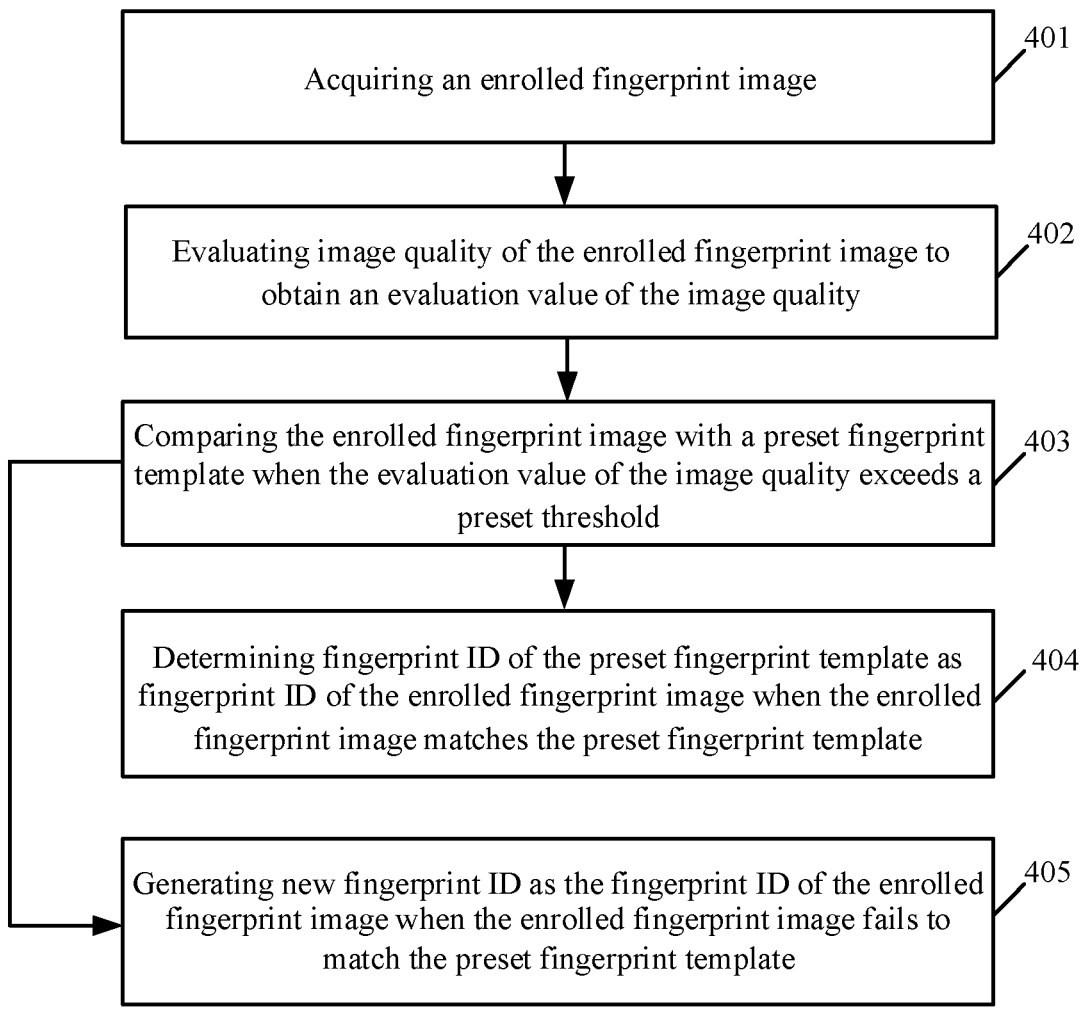
FIG. 4 is a schematic flow chart illustrating a method for fingerprint enrollment according to a fourth implementation of the present disclosure.

FIG. 4 is a schematic flow chart illustrating a method for fingerprint enrollment according to a fourth implementation of the present disclosure. The method for fingerprint enrollment illustrated in the implementation of the present disclosure begins at block 401.

At block 401, an enrolled fingerprint image is acquired.

At block 402, image quality of the enrolled fingerprint image is evaluated to obtain an evaluation value of the image quality.

The image quality of the enrolled fingerprint image can be evaluated as follows. The image quality of the enrolled fingerprint image can be evaluated with at least one evaluation index of image quality to obtain the evaluation value of the image quality. The evaluation index of image quality includes but is not limited to: mean gray level, mean squared error, entropy, edge preserving degree, signal to noise ratio, and the like. It can be considered that the larger the evaluation value of the image quality obtained, the better the image quality.

It should be noted that, there are certain limitations in evaluating image quality using a single evaluation index. Therefore, the image quality can be evaluated with multiple evaluation indexes of image quality. During image quality evaluation, when the number of the evaluation indexes of image quality is larger, evaluation effect of the image quality is not necessarily better because the more evaluation indexes of image quality, the higher the computational complexity of the process of the image quality evaluation. Therefore, in the case of high requirements for image quality evaluation, the image quality can be evaluated with two to ten evaluation indexes of image quality. The number of the evaluation indexes of image quality to be selected and which evaluation index is to be selected depend on specific implementations. The evaluation indexes of image quality are also necessary to be selected in combination with specific situations. The evaluation indexes of image quality selected for image quality evaluation in dark environment may be different from bright environment.

One evaluation index of image quality may be used for evaluation when requirements for accuracy of the image quality evaluation is not high. For example, entropy of an image to be processed is used to obtain the evaluation value of the image quality. The larger the entropy, the higher the image quality and vice versa.

Multiple evaluation indexes of image quality may be used for evaluation when requirements for accuracy of the image quality evaluation is high. When the image quality evaluation of the enrolled fingerprint image is performed with multiple evaluation indexes of image quality, the weight of each of the multiple evaluation indexes of image quality may be set. As such, multiple evaluation values of image quality may be obtained. According to the multiple evaluation values of image quality and corresponding weights, a final evaluation value of image quality can be obtained. For example, three evaluation indexes of image quality are index A, index B, and index C. Index A has a weight of $a1$, index B has a weight of $a2$, and index C has a weight of $a3$. When index A, index B, and index C are used for image quality evaluation of an image, an evaluation value of image quality corresponding to index A is $b1$, an evaluation value of image quality corresponding to index B is $b2$, and an evaluation value of image quality corresponding to index C is $b3$, the final evaluation value of image quality is equal to $a1b1+a2b2+a3b3$. Usually, the larger the evaluation value of image quality, the better the image quality.

At block 403, the enrolled fingerprint image is compared with the preset fingerprint template when the evaluation value of the image quality exceeds a preset threshold.

In an example, the preset threshold can be set by a user or system default. It can be considered that proceed to block 403 only when the image quality is good (that is, when the evaluation value of image quality exceeds the preset threshold), so as to ensure to some extent the image quality of the enrolled fingerprint image.

In an example, the operation of comparing the enrolled fingerprint image with the preset fingerprint template can be omitted when the evaluation value of image quality is less than or equal to the preset threshold. In this case, the operation of storing the enrolled fingerprint image as a fingerprint template can also be omitted.

At block 404, fingerprint ID of the preset fingerprint template is determined as fingerprint ID of the enrolled fingerprint image when the enrolled fingerprint image matches the preset fingerprint template.

At block 405, new fingerprint ID is generated as the fingerprint ID of the enrolled fingerprint image when the enrolled fingerprint image fails to match the preset fingerprint template.

For detailed descriptions of the operations at block 401 and blocks 403 to 405, reference can be made to corresponding operations of the method for fingerprint enrollment illustrated in FIG. 1, and details are not repeated herein.

It can be seen that, in the implementations of the present disclosure, the enrolled fingerprint image is acquired. The enrolled fingerprint image is compared with the preset fingerprint template when the evaluation value of the image quality of the enrolled fingerprint image exceeds the preset threshold. The fingerprint ID of the preset fingerprint template is determined as the fingerprint ID of the enrolled fingerprint image when the enrolled fingerprint image matches the preset fingerprint template. The new fingerprint ID is generated as the fingerprint ID of the enrolled fingerprint image when the enrolled fingerprint image fails to match the preset fingerprint template. In this way, when the image quality of the enrolled fingerprint image is good, during multiple fingerprint enrollment, fingerprint images of the same finger can be mapped to the same fingerprint ID, thereby reducing the risk of failure of the fingerprint recognition resulting from recognizing the fingerprint images of the same finger as having different fingerprint ID. In addition, the efficiency of fingerprint recognition is improved.

The following illustrates an apparatus configured to implement the methods for fingerprint enrollment mentioned above.

Figure 5A:
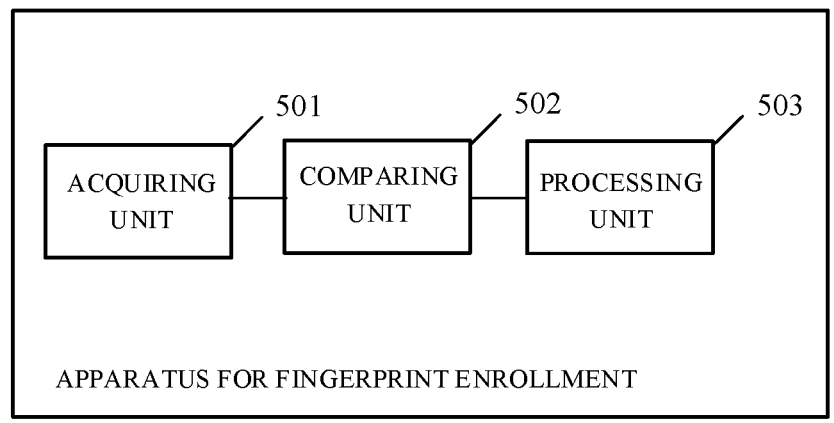
FIG. 5A is a schematic structural diagram illustrating an apparatus for fingerprint enrollment according to an implementation of the present disclosure.

FIG. 5A is a schematic structural diagram illustrating an apparatus for fingerprint enrollment according to an implementation of the present disclosure. The apparatus for fingerprint enrollment illustrated in the implementation of the present disclosure includes an acquiring unit 501, a comparing unit 502, and a processing unit 503.

The acquiring unit 501 is configured to acquire an enrolled fingerprint image. The comparing unit 502 is configured to compare the enrolled fingerprint image with a preset fingerprint template. The processing unit 503 is configured to determine fingerprint ID of the preset fingerprint template as fingerprint ID of the enrolled fingerprint image when the comparing unit 502 determines that the enrolled fingerprint image matches the preset fingerprint template. The processing unit 503 is further configured to generate new fingerprint ID as the fingerprint ID of the enrolled fingerprint image when the comparing unit 502 determines that the enrolled fingerprint image fails to match the preset fingerprint template.

In an implementation, after generating the new fingerprint ID as the fingerprint ID of the enrolled fingerprint image, the processing unit 503 is further configured to store the enrolled fingerprint image as a new fingerprint template when the comparing unit 502 determines that the enrolled fingerprint image fails to match the preset fingerprint template.

In an implementation, in terms of generating the new fingerprint ID as the fingerprint ID of the enrolled fingerprint image, the processing unit 503 is configured to acquire current time and current geographical location information, to generate the new fingerprint ID according to the current time and the current geographical location information, and to determine the new fingerprint ID as the fingerprint ID of the enrolled fingerprint image.

In an implementation, in terms of acquiring the current time and the current geographical location information, the processing unit 503 is configured to read the current time via a clock application and to determine the current geographical location information via GPS or Wi-Fi positioning technologies.

In an implementation, in terms of generating the new fingerprint ID as the fingerprint ID of the enrolled fingerprint image, the processing unit 503 is configured to acquire the new fingerprint ID input by a user and to determine the new fingerprint ID as the fingerprint ID of the enrolled fingerprint image.

In an implementation, after the acquiring unit 501 acquires the enrolled fingerprint image, the acquiring unit 501 is further configured to acquire unique identification information of a current user, and to acquire the preset fingerprint template corresponding to the unique identification information, where the preset fingerprint template is for the comparing unit 502 to be compared with the enrolled fingerprint image.

Figure 5B:
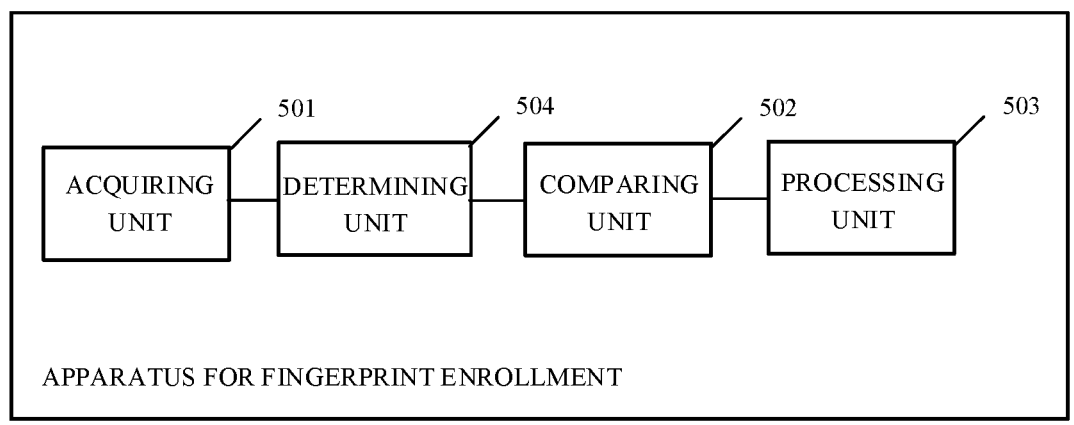
FIG. 5B is another schematic structural diagram illustrating the apparatus for fingerprint enrollment illustrated in FIG. 5A according to an implementation of the present disclosure.

FIG. 5B illustrates a variation of the apparatus for fingerprint enrollment illustrated in FIG. 5A. Compared with FIG. 5A, the apparatus illustrated in FIG. 5B further includes a determining unit 504.

The determining unit 504 is configured to determine whether the enrolled fingerprint image is a fingerprint image from a dry finger or a wet finger after the acquiring unit 501 acquires the enrolled fingerprint image, where the enrolled fingerprint image is for the comparing unit 502 to be compared with the preset fingerprint template when the determining unit 504 determines that the enrolled fingerprint image is not a fingerprint image from a dry finger or a wet finger.

Figure 5C:
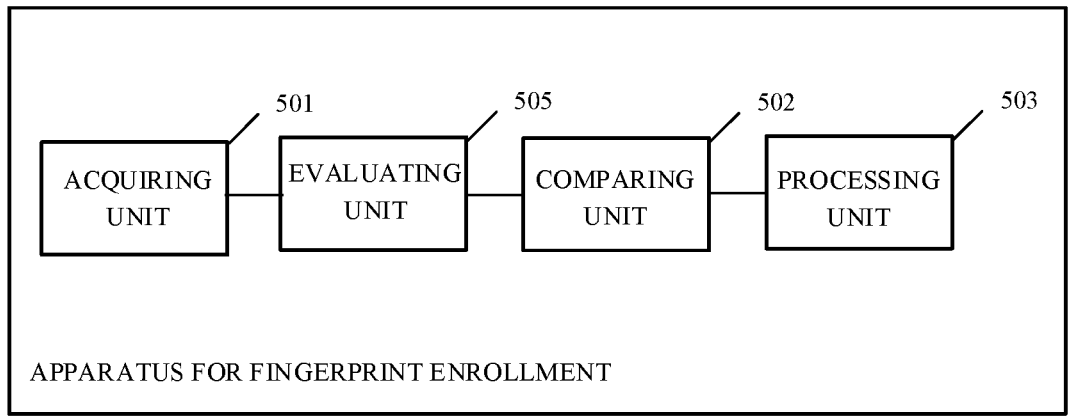
FIG. 5C is another schematic structural diagram illustrating the apparatus for fingerprint enrollment illustrated in FIG. 5A according to an implementation of the present disclosure.

FIG. 5C illustrates another variation of the apparatus for fingerprint enrollment illustrated in FIG. 5A. Compared with FIG. 5A, the apparatus illustrated in FIG. 5C further includes an evaluating unit 505.

The evaluating unit 505 is configured to evaluate image quality of the enrolled fingerprint image to obtain an evaluation value of the image quality after the acquiring unit 501 acquires the enrolled fingerprint image, where the enrolled fingerprint image is for the comparing unit 502 to be compared with the preset fingerprint template when the evaluating unit 505 evaluates that the evaluation value of the image quality exceeds a preset threshold.

Figure 5D:
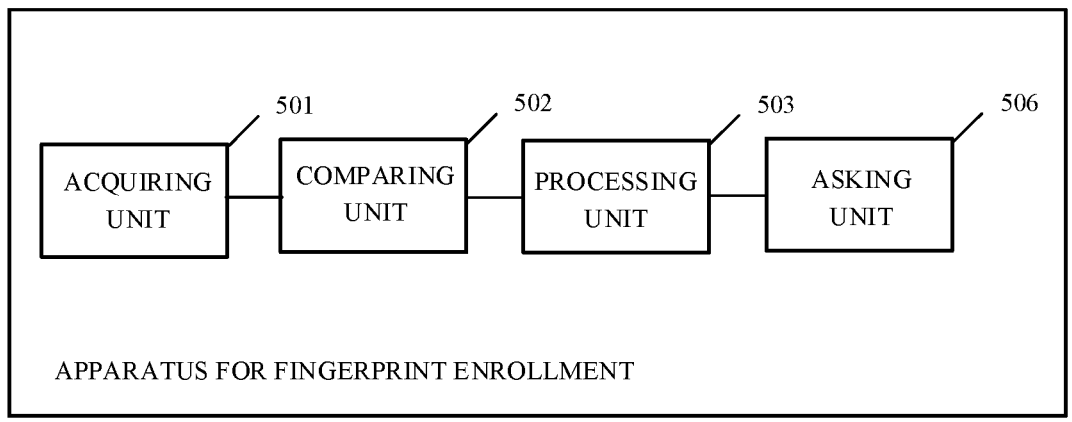
FIG. 5D is another schematic structural diagram illustrating the apparatus for fingerprint enrollment illustrated in FIG. 5A according to an implementation of the present disclosure.

FIG. 5D illustrates another variation of the apparatus for fingerprint enrollment illustrated in FIG. 5A. Compared with FIG. 5A, the apparatus illustrated in FIG. 5D further includes an asking unit 506.

The asking unit 506 is configured to ask the user to determine whether the enrolled fingerprint image and the preset fingerprint template are from a same finger.

After the enrolled fingerprint image fails to match the preset fingerprint template, the processing unit 503 is further configured to determine the fingerprint ID of the preset fingerprint template as the fingerprint ID of the enrolled fingerprint image and store the enrolled fingerprint image as the new fingerprint template, when the enrolled fingerprint image and the preset fingerprint template are from the same finger, and proceed to generating the new fingerprint ID as the fingerprint ID of the enrolled fingerprint image and storing the enrolled fingerprint image as the new fingerprint template, when the enrolled fingerprint image and the preset fingerprint template are from different fingers.

It can be seen that, with the apparatus for fingerprint enrollment illustrated in the implementations of the present disclosure, the enrolled fingerprint image is acquired. The enrolled fingerprint image is compared with the preset fingerprint template. The fingerprint ID of the preset fingerprint template is determined as the fingerprint ID of the enrolled fingerprint image when the enrolled fingerprint image matches the preset fingerprint template. The new fingerprint ID is generated as the fingerprint ID of the enrolled fingerprint image when the enrolled fingerprint image fails to match the preset fingerprint template. In this way, fingerprint images of the same finger obtained via multiple fingerprint enrollment can be mapped to the same fingerprint ID, thereby reducing the risk of failure of the fingerprint recognition resulting from recognizing the fingerprint images of the same finger as having different fingerprint ID. In addition, the efficiency of fingerprint recognition is improved.

It should be noted that, the terminal illustrated in the apparatus implementations of the present disclosure is presented in form of a functional unit. Term "unit" used herein should be understood as a meaning which is as broad as possible and an object for realizing an illustrated function of each "unit" may be, for example, an application specific integrated circuit (ASIC), a single circuit, a processor (shared, dedicated, or chip unit) configured to execute one or more software or firmware programs and a memory, a combined logical circuit, and/or other suitable components for realizing the above functions.

Figure 6:
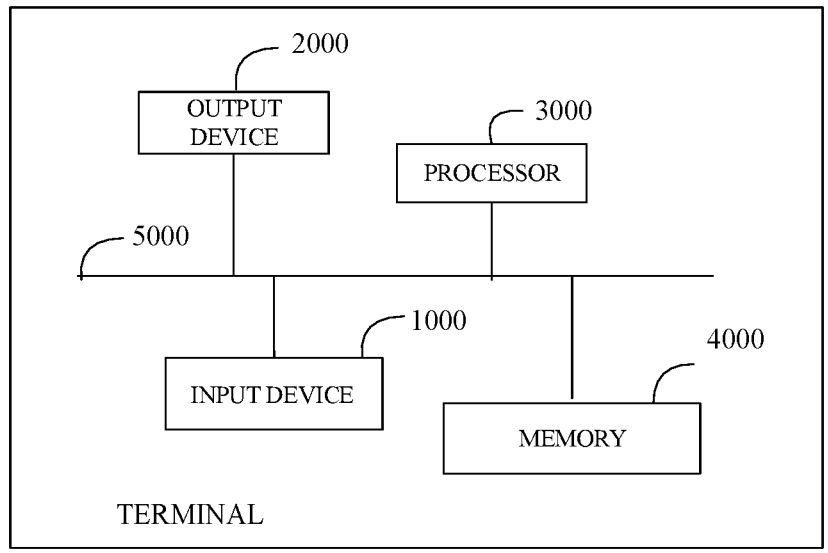
FIG. 6 is a schematic structural diagram illustrating a terminal according to an implementation of the present disclosure.

For example, the functions of the acquiring unit 501 configured to acquire an enrolled fingerprint image may be realized by a terminal illustrated in FIG. 6. Specifically, a processor 3000 is configured to invoke executable program codes in a memory 4000 to acquire the enrolled fingerprint image.

FIG. 6 is a schematic structural diagram illustrating a terminal according to an implementation of the present disclosure. The terminal illustrated in the implementation of the present disclosure may include at least one input device 1000, at least one output device 2000, at least one processor 3000 such as a central processing unit (CPU), and a memory 4000. The input device 1000, the output device 2000, the processor 3000, and the memory 4000 are coupled together via a bus 5000.

The input device 1000 may be a touch panel, a physical key, a mouse, and the like.

The output device 2000 may be a display screen.

The memory 4000 may be a high-speed random access memory (RAM), or may be a non-volatile memory such as a disk memory. The memory 4000 is configured to store a set of program codes. The input device 1000, the output device 2000, and the processor 300 are configured to evoke the program codes stored in the memory 4000 to carry out the following operations.

The processor 3000 is configured to: acquire an enrolled fingerprint image, compare the enrolled fingerprint image with a preset fingerprint template, determine fingerprint ID of the preset fingerprint template as fingerprint ID of the enrolled fingerprint image when the enrolled fingerprint image matches the preset fingerprint template, and generate new fingerprint ID as the fingerprint ID of the enrolled fingerprint image when the enrolled fingerprint image fails to match the preset fingerprint template.

In an implementation, after generating the new fingerprint ID as the fingerprint ID of the enrolled fingerprint image, the processor 3000 is further configured to store the enrolled fingerprint image as a new fingerprint template.

In an implementation, in terms of generating the new fingerprint ID as the fingerprint ID of the enrolled fingerprint image, the processor 3000 is configured to acquire current time and current geographical location information, to generate the new fingerprint ID according to the current time and the current geographical location information, and to use the new fingerprint ID as the fingerprint ID of the enrolled fingerprint image.

In an implementation, in terms of acquiring the current time and the current geographical location information, the processor 3000 is configured to read the current time via a clock application and to determine the current geographical location information via GPS or Wi-Fi positioning technologies.

In an implementation, in terms of generating the new fingerprint ID as the fingerprint ID of the enrolled fingerprint image, the processor 3000 is configured to acquire the new fingerprint ID input by a user and to determine the new fingerprint ID as the fingerprint ID of the enrolled fingerprint image.

In an implementation, after the enrolled fingerprint image is acquired and before the enrolled fingerprint image is compared with the preset fingerprint template, the processor 3000 is further configured to acquire unique identification information of a current user, to acquire the preset fingerprint template corresponding to the unique identification information, and to proceed to comparing the enrolled fingerprint image with the preset fingerprint template.

In an implementation, after the enrolled fingerprint image is acquired and before the enrolled fingerprint image is compared with the preset fingerprint template, the processor 3000 is further configured to determine whether the enrolled fingerprint image is a fingerprint image from a dry finger or a wet finger, and to proceed to comparing the enrolled fingerprint image with the preset fingerprint template when the enrolled fingerprint image is not a fingerprint image from a dry finger or a wet finger.

In an implementation, after the enrolled fingerprint image is acquired and before the enrolled fingerprint image is compared with the preset fingerprint template, the processor 3000 is further configured to evaluate image quality of the enrolled fingerprint image to obtain an evaluation value of the image quality, and to proceed to comparing the enrolled fingerprint image with the preset fingerprint template when the evaluation value of the image quality exceeds a preset threshold.

In an implementation, after the enrolled fingerprint image fails to match the preset fingerprint template, the processor 3000 is further configured to ask the user to determine whether the enrolled fingerprint image and the preset fingerprint template are from a same finger, to determine the fingerprint ID of the preset fingerprint template as the fingerprint ID of the enrolled fingerprint image and store the enrolled fingerprint image as the new fingerprint template, when the enrolled fingerprint image and the preset fingerprint template are from the same finger, and to proceed to generating the new fingerprint ID as the fingerprint ID of the enrolled fingerprint image and storing the enrolled fingerprint image as the new fingerprint template, when the enrolled fingerprint image and the preset fingerprint template are from different fingers.

Figure 7:
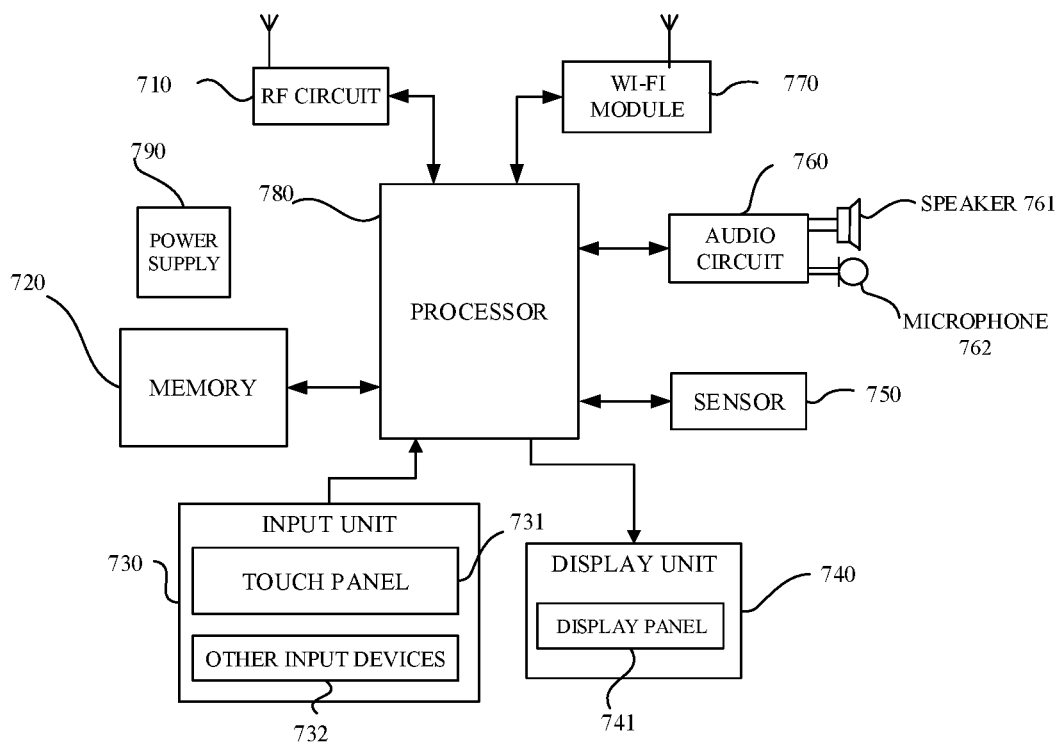
FIG. 7 is a schematic structural diagram illustrating a mobile phone according to an implementation of the present disclosure.

FIG. 7 is a block diagram illustrating a partial structure of a mobile phone related to a terminal according to an implementation of the present disclosure. As illustrated in FIG. 7, the mobile phone includes a radio frequency (RF) circuit 710, a memory 720, an input unit 730, a display unit 740, a sensor 750, an audio circuit 760, a wireless fidelity (Wi-Fi) module 770, a processor 780, a power supply 790, and other components. The structure of the mobile phone illustrated in FIG. 7 does not constitute any limitation on the mobile phone. The mobile phone in the disclosure may include more or fewer components than illustrated, or may combine certain components or different components.

In the following, various components of the mobile phone will be described in detail with reference to FIG. 7.

The RF circuit 710 is configured to transmit or receive information during transmission and reception of information or during a call. In an example, downlink information of a base station is received and then sent to the processor 780 for processing. In addition, uplink data may be transmitted to the base station. Generally, the RF circuit 710 includes but is not limited to an antenna, at least one amplifier, a transceiver, a coupler, a low noise amplifier (LNA), a duplexer, and the like. In addition, the RF circuit 710 may also communicate with the network and other devices via wireless communication. The wireless communication mentioned above may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and the like.

The memory 720 is configured to store software programs and modules, and the processor 780 is configured to execute various function applications and data processing of the mobile phone by running the software programs and the modules stored in the memory 720. The memory 720 mainly includes a program storing region and a data storing region. The program storing region may store an operating system, application programs (for example, a voice playing function, an image playing function, etc.) required for at least one function, and the like. The data storing region may store data (for example, audio data, phone book, etc.) created according to use of the mobile phone, and the like. In addition, the memory 720 may include a high-speed random access memory (RAM), and may further include a non-transitory memory such as at least one disk storage device, a flash device, or other transitory solid storage devices.

The input unit 730 is configured to receive input digital or character information and generate key signal input associated with user setting and function control of the mobile phone. In an example, the input unit 730 may include a touch panel 731 and other input devices 732. The touch panel 731, also known as a touch screen, can collect touch operations of a user on or near the touch panel 731 (such as an operation of the user using a finger, a stylus, or any other suitable object or accessory on or near the touch panel 731) and drive a corresponding connection device according to a preset program. For example, the touch panel 731 may include a touch detection device and a touch controller. The touch detection device is configured to detect a touch orientation of the user and a signal brought by the touch operation, and to send the signal to the touch controller. The touch controller is configured to receive touch information from the touch detection device, convert the touch information into contact coordinates and then send the contact coordinates to the processor 780, and receive and execute commands sent from the processor 780. In addition, the touch panel 731 may be implemented in various types such as resistive, capacitive, infrared, and surface acoustic waves. In addition to the touch panel 731, the input unit 730 may also include other input devices 732. In an example, the other input devices 732 may include, but are not limit to, one or more of a physical key, a function key (such as a volume control key, a switch key, and the like), a trackball, a mouse, a joystick, and the like.

The display unit 740 is configured to display information input by the user or information provided for the user or various menus of the mobile phone. The display unit 740 may include a display panel 741. In at least one implementation, the display panel 741 may be configured in the form of a liquid crystal display (LCD), an organic light-emitting diode (OLED), and the like. Further, the touch panel 731 may cover the display panel 741. When the touch panel 731 detects a touch operation on or near the touch panel 731, the touch operation is transmitted to the processor 780 to determine the type of the touch event, and then the processor 780 provides a corresponding visual output on the display panel 741 according to the type of the touch event. Although the touch panel 731 and the display panel 741 are illustrated as two separate components in FIG. 7 to realize the input and output functions of the mobile phone, in some implementations, the touch panel 731 may be integrated with the display panel 741 to implement the input and output functions of the mobile phone.

The mobile phone may also include at least one sensor 750, such as a light sensor, a motion sensor, and other sensors. In an example, the light sensor may include an ambient light sensor and a proximity sensor. The ambient light sensor is configured to adjust the brightness of the display panel 741 according to ambient lights, and the proximity sensor is configured to turn off the display panel 741 and/or backlight when the mobile phone reaches nearby the ear. As a motion sensor, the accelerometer sensor is configured to detect the magnitude of acceleration in all directions (typically three axes) and when the mobile phone is stationary, the accelerometer sensor is configured to detect the magnitude and direction of gravity. The accelerometer sensor can be used for mobile phone-gesture recognition-related applications (such as vertical-horizontal screen switch, related games, magnetometer attitude calibration), or for vibration-recognition related functions (such as a pedometer, percussion), and the like. The mobile phone can also be configured with a gyroscope, a barometer, a hygrometer, a thermometer, and an infrared sensor and other sensors, which will not be repeated herein.

The audio circuit 760, a speaker 761, a microphone 762 may provide an audio interface between the user and the mobile phone. The audio circuit 760 is configured to convert the received audio data into electrical signals and transfer the electrical signals to the speaker 761. The speaker 761 is configured to convert the electrical signals into sound signals for output. On the other hand, the microphone 762 is configured to convert the collected sound signals into electrical signals. The audio circuit 760 is configured to receive and convert the electrical signals into audio data for output. The processor 780 is configured to process the audio data and then transmit the audio data processed via the RF circuit 710 to another mobile phone for example, or, the audio data is output to the memory 720 for further processing.

Wi-Fi relates to a short-range wireless transmission technologies. With the Wi-Fi module 770, the mobile phone may assist the user in E-mail receiving and sending, webpage browsing, access to streaming media, and the like. Wi-Fi provides users with wireless broadband internet access. Although the Wi-Fi module 770 is illustrated in FIG. 7, it should be understood that the Wi-Fi module 770 is not essential to the mobile phone and can be omitted according to actual needs without departing from the essential nature of the present disclosure.

The processor 780 is a control center of the mobile phone. Various interfaces and lines are configured to connect various parts of the whole mobile phone. The mobile phone is monitored via running or executing software programs and/or modules stored in the memory 720, and invoking data stored in the memory 720 to perform various functions of the mobile phone and process data. In at least one implementation, the processor 780 may include one or more processing units. For example, in the processor 780, an application processor may be integrated with a modem processor. The application processor is mainly configured to manage the operating system, the user interface, the application programs, and the like. The modem processor is mainly configured for wireless communication. It will be appreciated that the modem processor may not be integrated into the processor 780.

The mobile phone also includes the power supply 790 (such as a battery) configured to supply power to various components. In at least one implementation, the power supply 790 is configured to be logically coupled with the processor 780 through a power management system to enable management of charging, discharging, and power consumption via the power management system.

Although not illustrated, the mobile phone may include a camera, a Bluetooth module, and the like, which will not be repeated herein.

In the foregoing implementations, respective steps, methods, flows may be implemented based on the structure of the terminal. The sensor 750 can include a proximity sensor and a humidity sensor, and the touch panel 731 can be used as a fingerprint recognition module.

The implementations of the present disclosure further provides a non-transitory computer readable storage medium. The non-transitory computer readable storage medium may store programs, and the programs are operable to execute part of or all operations of any of the methods for fingerprint enrollment recited in the method implementations mentioned above.

The implementations of the present disclosure also provide a computer program product. The computer program product includes a non-transitory computer readable storage medium storing computer programs. The computer programs are operable with a computer to perform part of or all operations of any of the methods for fingerprint enrollment recited in the method embodiments mentioned above.

Although the disclosure is described in conjunction with various implementations herein, a person skilled in the art can understand and achieve other variations of the disclosed implementations in the process of implementing the claimed disclosure by making reference to the drawings, the disclosure, and the appended claims. In the claims, "comprising" does not exclude other compositions or operations, and "a" or "one" does not exclude plurality. A single processor or other units may implement multiple functions exemplified in the claims. Some means are recited in different dependent claims, but this does not represent that these means cannot be combined to generate a good effect.

A person skilled in the art will understand that the implementations of the disclosure may be provided as a method, an apparatus (device), or a computer program product. Accordingly, the disclosure may adopt the form of complete hardware implementations, complete software implementations, or implementations integrating software with hardware. Moreover, the disclosure may adopt the form of the computer program product implemented on one or more computer readable storage medium (including, but not limited to, a disk memory, a compact disc read-only memory (CD-ROM), an optical memory, and the like) containing computer readable program codes. The computer programs are stored/distributed in appropriate medium. The computer programs can be provided with other hardware or as part of the hardware. The computer programs may adopt other distribution forms, for example, the computer programs can be provided via an internet or other wired or wireless telecommunication system.

The disclosure is described with reference to flowcharts and/or block diagrams of the method, the apparatus (device), and the computer program product according to the implementations of the disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to operate in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to computers or other programmable data processing devices, so that computer-implemented processing is generated by executing a series of operation on the computers or the other programmable devices, and therefore the instructions executed on the computers or the other programmable devices provide operations of achieving the functions designated in one or more flows of the flowcharts and/or one or more blocks of the block diagrams.

Although the disclosure is described in conjunction with specific features and implementations of the disclosure, it is apparent that various modifications and changes may be made to the disclosure without departing from the spirit and scope of the disclosure. Accordingly, the present description and accompanying drawings are merely exemplary illustrations to the disclosure defined by the appended claims, and the disclosure is intended to cover any and all modifications, changes, combinations or equivalents within the scope of the disclosure. It is apparent that a person skilled in the art may make various modifications and transformations to the disclosure without departing from the spirit and scope of the disclosure. Thus, if these modifications and transformations of the disclosure fall within the scope of the claims of the disclosure and an equivalent technology thereof, the disclosure is also intended to include these modifications and transformations.

What is claimed is:

1. A method for fingerprint enrollment, comprising:
   acquiring an enrolled fingerprint image;
   comparing the enrolled fingerprint image with a preset fingerprint template;
   asking a user to determine whether the enrolled fingerprint image and the preset fingerprint template are from a same finger after the enrolled fingerprint image fails to match the preset fingerprint template;
   based on a determination that the enrolled fingerprint image and the preset fingerprint template are from the same finger, determining fingerprint identification (ID) of the preset fingerprint template as the fingerprint ID of the enrolled fingerprint image;
   based on a determination that the enrolled fingerprint image and the preset fingerprint template are from different fingers, generating a new fingerprint ID as the fingerprint ID of the enrolled fingerprint image; and
   storing the enrolled fingerprint image as a new fingerprint template.

2. The method of claim 1, wherein generating the new fingerprint ID as the fingerprint ID of the enrolled fingerprint image comprises:
   acquiring current time and current geographical location information;
   generating the new fingerprint ID according to the current time and the current geographical location information; and
   determining the new fingerprint ID as the fingerprint ID of the enrolled fingerprint image.

3. The method of claim 2, wherein acquiring the current time and the current geographical location information comprises:
   reading the current time via a clock application, and determining the current geographical location information via global positioning system (GPS) or wireless fidelity (Wi-Fi) positioning technologies.

4. The method of claim 1, wherein generating the new fingerprint ID as the fingerprint ID of the enrolled fingerprint image comprises:
   acquiring the new fingerprint ID input by a user, and determining the new fingerprint ID as the fingerprint ID of the enrolled fingerprint image.

5. The method of claim 1, further comprising:
   after acquiring the enrolled fingerprint image and before comparing the enrolled fingerprint image with the preset fingerprint template:
   acquiring unique identification information of a current user;
   acquiring the preset fingerprint template corresponding to the unique identification information; and
   proceeding to comparing the enrolled fingerprint image with the preset fingerprint template.

6. The method of claim 5, wherein the unique identification information comprises at least one of: a mailbox, a user name, a social account, and a phone number.

7. The method of claim 1, further comprising:
   after acquiring the enrolled fingerprint image and before comparing the enrolled fingerprint image with the preset fingerprint template:
   determining whether the enrolled fingerprint image is a fingerprint image from a dry finger or a wet finger; and
   proceeding to comparing the enrolled fingerprint image with the preset fingerprint template based on a determination that the enrolled fingerprint image is not a fingerprint image from a dry finger or a wet finger.

8. The method of claim 1, further comprising:
   after acquiring the enrolled fingerprint image and before comparing the enrolled fingerprint image with the preset fingerprint template:
   evaluating image quality of the enrolled fingerprint image to obtain an evaluation value of the image quality; and
   proceeding to comparing the enrolled fingerprint image with the preset fingerprint template when the evaluation value of the image quality exceeds a preset threshold.

9. The method of claim 1, further comprising:
   after generating the new fingerprint ID as the fingerprint ID of the enrolled fingerprint image,
   storing the enrolled fingerprint image as a new fingerprint template.

10. A terminal, comprising:
    at least one processor; and
    a computer readable storage, coupled to the at least one processor and storing at least one computer executable instruction thereon which, when executed by the at least one processor, causes the at least one processor to:
    acquire an enrolled fingerprint image;
    compare the enrolled fingerprint image with a preset fingerprint template;
    ask a user to determine whether the enrolled fingerprint image and the preset fingerprint template are from a same finger after the enrolled fingerprint image fails to match the preset fingerprint template;
    determine fingerprint identification (ID) of the preset fingerprint template as fingerprint ID of the enrolled fingerprint image when the enrolled fingerprint image and the preset fingerprint template are from the same finger;
    generate new fingerprint ID as the fingerprint ID of the enrolled fingerprint image when the enrolled fingerprint image and the preset fingerprint template are from different fingers; and
    store the enrolled fingerprint image as the new fingerprint template.

11. The terminal of claim 10, wherein the at least one processor configured to generate the new fingerprint ID as the fingerprint ID of the enrolled fingerprint image is configured to:
    acquire current time and current geographical location information;
    generate the new fingerprint ID according to the current time and the current geographical location information; and
    determine the new fingerprint ID as the fingerprint ID of the enrolled fingerprint image.

12. The terminal of claim 11, wherein the at least one processor configured to acquire the current time and the current geographical location information is configured to:
    read the current time via a clock application and determine the current geographical location information via GPS or Wi-Fi positioning technologies.

13. The terminal of claim 10, wherein the at least one processor configured to generate the new fingerprint ID as the fingerprint ID of the enrolled fingerprint image is configured to:
    acquire the new fingerprint ID input by a user and determine the new fingerprint ID as the fingerprint ID of the enrolled fingerprint image.

14. The terminal of claim 10, wherein the at least one processor is further configured to:
   acquire unique identification information of a current user;
   acquire the preset fingerprint template corresponding to the unique identification information; and
   proceed to comparing the enrolled fingerprint image with the preset fingerprint template.

15. The terminal of claim 10, wherein the at least one processor is further configured to:
   determine whether the enrolled fingerprint image is a fingerprint image from a dry finger or a wet finger; and
   proceed to comparing the enrolled fingerprint image with the preset fingerprint template when the enrolled fingerprint image is not a fingerprint image from a dry finger or a wet finger.

16. The terminal of claim 10, wherein the at least one processor is further configured to:
   evaluate image quality of the enrolled fingerprint image to obtain an evaluation value of the image quality; and
   proceed to comparing the enrolled fingerprint image with the preset fingerprint template when the evaluation value of the image quality exceeds a preset threshold.

17. A non-transitory computer readable storage medium storing a computer program which, when executed by a processor, causes the processor to carry out actions, comprising:
   acquiring an enrolled fingerprint image;
   comparing the enrolled fingerprint image with a preset fingerprint template;
   asking a user to determine whether the enrolled fingerprint image and the preset fingerprint template are from a same finger after the enrolled fingerprint image fails to match the preset fingerprint template;
   determining fingerprint identification (ID) of the preset fingerprint template as fingerprint ID of the enrolled fingerprint image when the enrolled fingerprint image are from the same finger;
   generating new fingerprint ID as the fingerprint ID of the enrolled fingerprint image when the enrolled fingerprint image and the preset fingerprint template are from different fingers; and
   storing the enrolled fingerprint image as the new fingerprint image.

* * * * *